(12) United States Patent
Jia et al.

(10) Patent No.: US 11,134,170 B2
(45) Date of Patent: Sep. 28, 2021

(54) CORRECTION OF FEED SKEWED IMAGES

(71) Applicant: Hewlett-Packard Development Company, L.P., Spring, TX (US)

(72) Inventors: Charles Jia, San Diego, CA (US); Jackie Shi Chung Fung, San Diego, CA (US); Kevin A Merrill, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/772,232

(22) PCT Filed: Dec. 15, 2017

(86) PCT No.: PCT/US2017/066868
§ 371 (c)(1),
(2) Date: Jun. 12, 2020

(87) PCT Pub. No.: WO2019/117968
PCT Pub. Date: Jun. 20, 2019

(65) Prior Publication Data
US 2021/0092257 A1 Mar. 25, 2021

(51) Int. Cl.
*H04N 1/387* (2006.01)
(52) U.S. Cl.
CPC .................. *H04N 1/3878* (2013.01)
(58) Field of Classification Search
None
See application file for complete search history.

(56) References Cited

U.S. PATENT DOCUMENTS

| 4,588,882 A | 5/1986 | Buxton et al. |
| 5,818,976 A | 10/1998 | Pasco et al. |
| 5,901,253 A | 5/1999 | Tretter |
| 7,200,285 B2 | 4/2007 | Li et al. |
| 9,319,547 B2 | 4/2016 | Isaev et al. |
| 2006/0039627 A1* | 2/2006 | Li .................. H04N 1/3878 382/289 |
| 2006/0039628 A1 | 2/2006 | Li |
| 2008/0226171 A1 | 9/2008 | Yin |

(Continued)

OTHER PUBLICATIONS

Banerjee, S et al., Real-time Embedded Skew Detection and Frame Removal, Sep. 2010, IEEE 17th Int'l Conference on Image Processing ~ 4 pages.

(Continued)

*Primary Examiner* — Frantz Bataille
(74) *Attorney, Agent, or Firm* — Mannava & Kang

(57) ABSTRACT

According to examples, an apparatus may include a processor and a memory on which is stored machine readable instructions executable by the processor to detect edges of a scanned object image. The instructions may also cause the processor to determine, based on the detected edges, that a feed skew has occurred on the scanned object image. In addition, based on a determination that the feed skew has occurred, the instructions may cause the processor to identify curved edges of the scanned object image, de-curve the identified curved edges through horizontal scanline scaling of the scanned object image to form a de-curved image, and produce a corrected image through vertical scanline scaling of the de-curved image.

15 Claims, 5 Drawing Sheets

(56) References Cited

U.S. PATENT DOCUMENTS

| | | |
|---|---|---|
| 2010/0014782 A1 | 1/2010 | Fero |
| 2012/0106844 A1 | 5/2012 | Ramachandrula |
| 2013/0051688 A1* | 2/2013 | Tanaka .................. G06F 40/109 |
| | | 382/229 |
| 2013/0156344 A1 | 6/2013 | Reese |
| 2014/0307973 A1* | 10/2014 | Young ..................... G06K 9/40 |
| | | 382/200 |

OTHER PUBLICATIONS

Dedhia, S. et al., Deskew Scanned Images of Documents & Text Pages with Solway Deskew, Aug. 15, 2011, http://www.blogsdna.com/ ~ 3 pages.

* cited by examiner

CORRECTION OF FEED SKEWED IMAGES

BACKGROUND

Captured images, such as scanned images, may have various distortions caused by mechanical properties or malfunctions of a scanner. A sheer or orthogonality distortion may occur where a scan line and media movement, such as paper path or scanner stepping, are not orthogonal. A page skew distortion may occur where scan lines and an object being scanned remain at an angle to each other, producing a constant skew angle. A more complex distortion is a feed skew that occurs where scanned media failed to move in a straight direction, producing a fan-like scanned image. The feed skew distortion may be caused by media feeding rollers of the scanner moving at different speeds with respect to each other.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
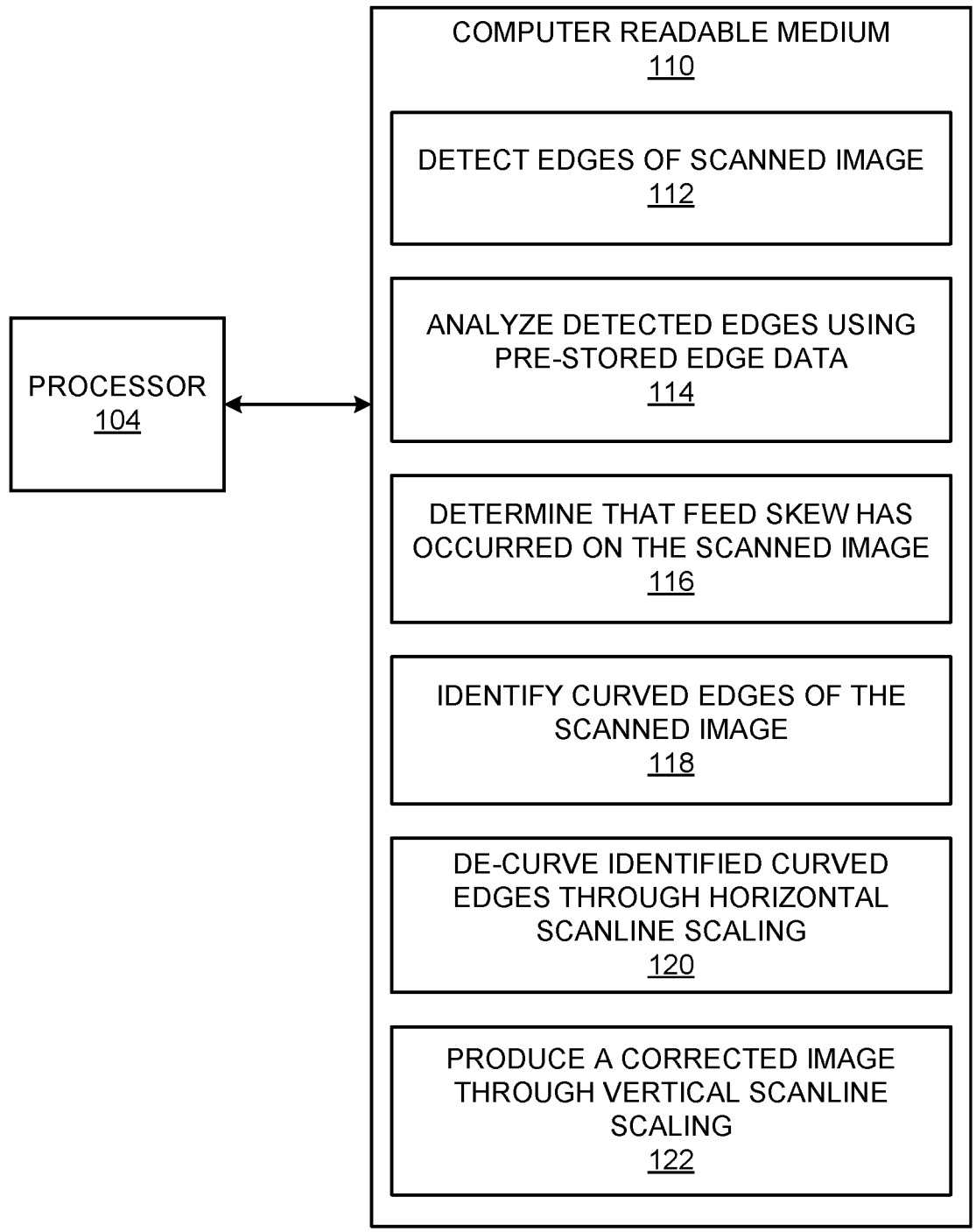
FIG. 1 shows an example apparatus that may correct distortion in captured images.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses and methods for detection and correction of scanned image distortions, and particularly, correction of feed skewed images. The apparatuses and methods disclosed herein may perform an automatic detection and correction of distortions of a digital image captured during scan or copy of an object. Types of targeted distortions to be corrected may include a feed skew—where scanned media failed to move in a straight direction, a sheer or orthogonality distortion—where scan line and media movement (paper path or scanner stepping) is not orthogonal, and a page skew—where scan lines and contents are at an angle (constant skew angle). In examples, a feed skewed image as discussed herein may be an image captured by a digital camera. The camera acquired image may have a skew distortion caused by a camera view point being at an angle to a horizontal plane. Additionally, the camera acquired image may have curved edge distortion caused by optical properties of the camera lens. The curved edge distortion may be more evident when the image is captured using a wide angle lens. The image distortion correction methods described herein may be applicable to correct skewed images acquired with a digital camera. Thus, references made herein to feed skewed images are intended to also pertain to skewed images captured using digital cameras.

The apparatuses and methods disclosed herein may analyze the captured image and may determine a type of distortion. The apparatus may use a background deskew hardware strip, which may also be referred to as a "smart background" to detect scanned object image edges. The apparatuses and methods disclosed herein may determine a type of distortion based on the detected edges of the scanned image. The apparatus may also capture an image of the "smart background" to correlate the captured image of an object with the image of the smart background in order to enhance detection of the edges of the object in the captured image. The apparatus may further apply an image correction operation or multiple image correction operations to the captured image of the object according to the type of distortion.

The apparatuses and methods disclosed herein may further detect and correct a feed skew of the scanned object image. The feed skew may result in a curved image of the object being captured through scanning. The apparatuses and methods disclosed herein may apply a mathematical formula to describe the curved edges of the skewed image and the 2D function $FS(x, y)$ that maps the pixels of the scanned image using x and y coordinates. The correction operation may apply the reverse function. The method may use a greedy algorithm-based transformation to first de-curve the curved edges with a horizontal scanline scaling, followed by a vertical scanline scaling of the de-curved image to produce a corrected image that closely matches the original scanned object.

In examples, if a feed skew has not occurred, other types of image distortions with four straight edges may be present in the scanned image. If the captured image has a rectangular shape, correction may not be needed. If the distortion is a regular skew (e.g., a rotational movement), the apparatuses and method disclosed herein may determine a skew angle and may correct the distortion by rotation of the scanned image. If the distortion in the captured image results in the scanned image being a parallelogram, the apparatuses and methods disclosed herein may determine an angle of rotation and/or an angle of shear (e.g., an angle between the sides) of the scanned object image. The apparatuses and methods disclosed herein may calculate a new corrected width as new width=width*cos (angle of shear). If the captured image distortion results in an arbitrary four-side shape with straight edges, a target width and a target height may be estimated.

A feed skew may be the most complex type of a scanned image distortion. As discussed above, the feed skew may be caused by uneven driving force in feeding the object, e.g., a page, through a scanner. The feed skew may be a result of a non-Euclidean transformation, which is not a result of translation, rotation, refection or a combination thereof. Therefore, the feed skew may not be corrected by simply rotating the image using a deskew operation. In examples, the methods and apparatuses disclosed herein may correct for feed skew through calculation (or estimation) of a target width and a target height and adjustment of the width for combined shear.

FIG. 1 shows a block diagram of an example apparatus 100 that may produce a corrected image of a feed skewed image. It should be understood that the apparatus 100 may include additional components and that some of the components described herein may be removed and/or modified without departing from a scope of the apparatus 100 disclosed herein.

The apparatus 100 may be a computing device, a tablet computer, a server computer, a smartphone, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the apparatus 100 may include multiple processors, multiple cores, or the like, without departing from a scope of the apparatus 100.

The apparatus 100 may also include a non-transitory computer readable medium 110 that may have stored thereon machine-readable instructions executable by the processor 104. Examples of the machine-readable instructions are shown as 112-122 and are further discussed below. Examples of the non-transitory computer readable medium 110 may include an electronic, magnetic, optical, or other physical storage device that contains or stores executable instructions. For example, the non-transitory computer readable medium 110 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 112 to detect edges of a scanned object image, e.g., a scanned image of an object. The object may be, for example, a sheet of paper, a page, or the like, that has been scanned or copied. The scanned object image may contain the image of the page, in which the scanned object image may be distorted in some way. As discussed above, one of the most complex distortions may be a feed skew that produces a curved image, e.g., an image having curved edges. The processor 104 may fetch, decode, and execute the machine-readable instructions 114 to analyze the detected edges of the scanned image, e.g., to determine whether the edges of the scanned image are straight, using pre-stored edge data, e.g., pre-stored smart background data). The pre-stored edge data may be data describing features of a straight edge or features of a curved edge, such as a curved edge produced by the feed skew.

The processor 104 may fetch, decode, and execute the machine-readable instructions 116 to determine that the feed skew has occurred on the scanned image based on the analysis of the detected edges. In other words, if a curved (non-straight) edge is detected, the processor 104 may determine that a feed skew has occurred during scanning or copying of the object. The processor 104 may fetch, decode, and execute the machine-readable instructions 118 to identify curved edges of the scanned image through application of a curvature formula. The curvature formula may accurately describe the profile of the scanned image of the original object.

The processor 104 may fetch, decode, and execute the machine-readable instructions 120 to de-curve the identified curved edges through horizontal scanline scaling. The processor 104 may apply the horizontal scanline scaling to produce straight side edges of the scanned images. In other words, application of the horizontal scanline scaling may result in the curved side edges closely approximating the straight side edges of the original object. The processor 104 may fetch, decode, and execute the machine-readable instructions 122 to produce a corrected image of the scanned image through vertical scanline scaling. The processor 104 may apply the vertical scanline scaling to correct the skew of the top and bottom edges of the scanned image and produce horizontal edges while adjusting the height of both of the side edges produced from the approximation of the curved edges. In one regard, through execution of the instructions 112-122, the processor 104 may produce a corrected image of the scanned object image that closely matches the original object.

Figure 2:
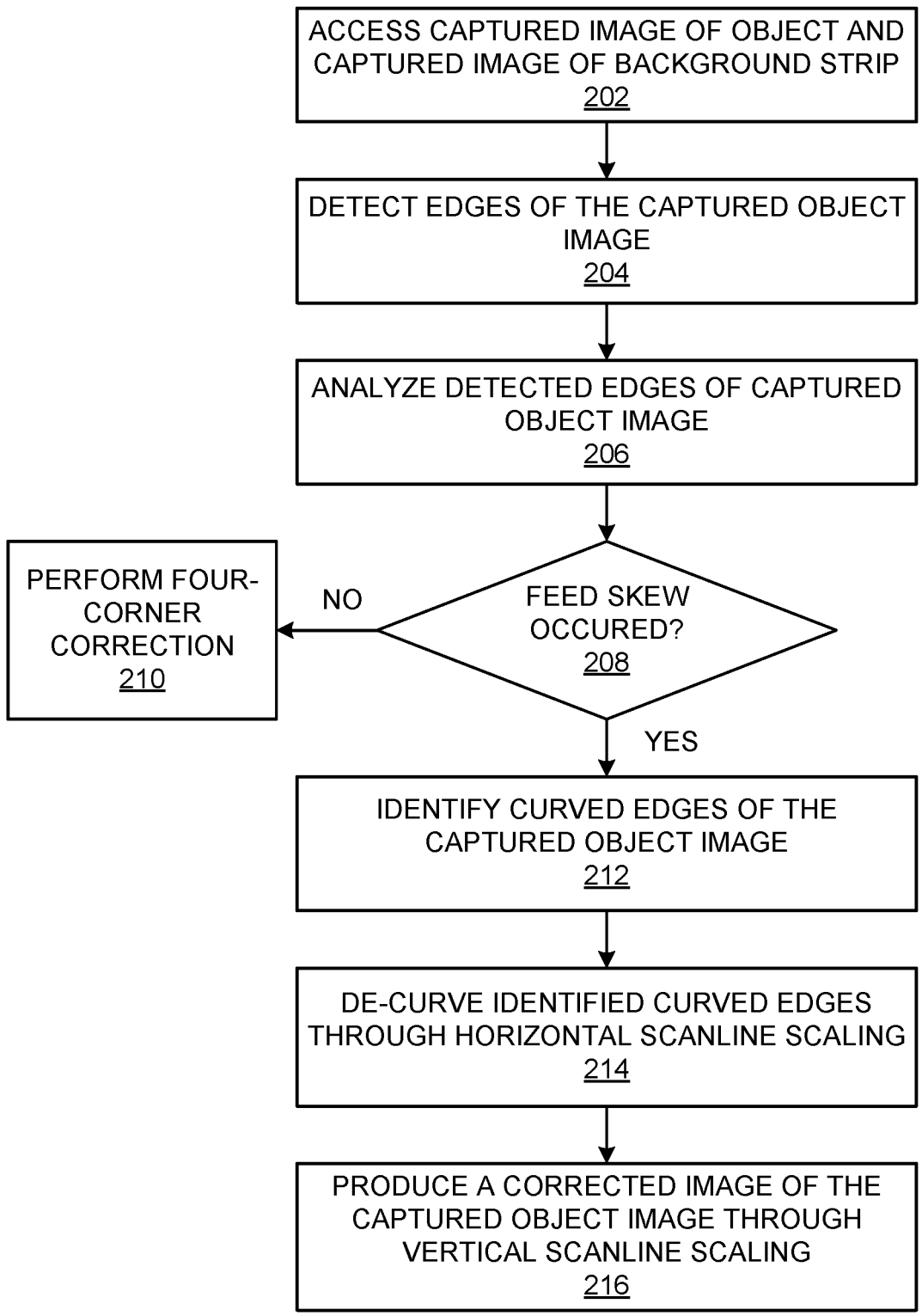
FIGS. 2 and 3, respectively, show flow diagrams of example methods for distortion correction.
Figure 3:
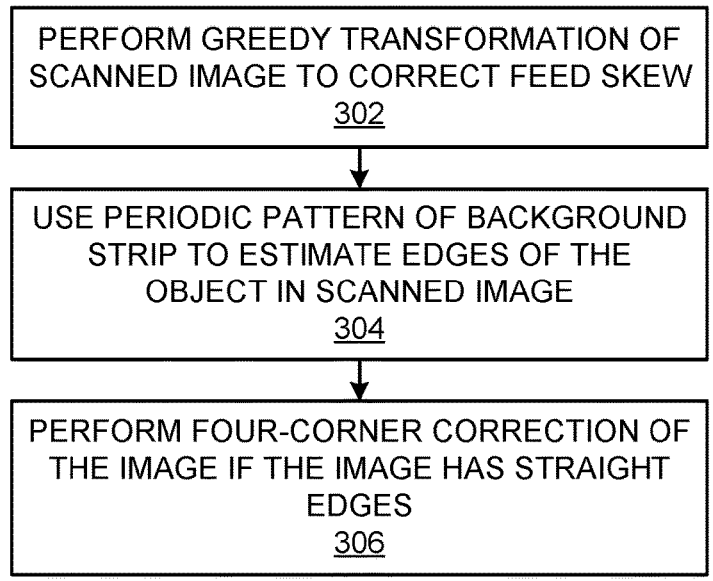

Turning now to FIGS. 2 and 3, there are respectively shown flow diagrams of example methods 200 and 300 for producing a corrected image of a feed skewed object image. It should be understood that the methods 200 and 300 depicted in FIGS. 2 and 3 may include additional operations and that some of the operations described therein may be removed and/or modified without departing from scopes of the methods 200 and 300. The descriptions of the methods 200 and 300 are also made with reference to the features depicted in FIG. 1 for purposes of illustration. Particularly, the processor 104 of the apparatus 100 may execute some or all of the operations included in the methods 200 and 300.

With reference first to FIG. 2, at block 202, the processor 104 may access a captured image of an object and a captured image of a background strip. The background strip, which may also be referred to as a "smart background," is a hardware strip with a periodic pattern applied on the strip. The periodic pattern may be used for better detection and identification of edges of the captured image of the object. Thus, for instance, the captured image of the object may include the image of the object on top of or in relation to an image of the hardware strip. At block 204, the processor 104 may detect edges of the captured object image. As discussed above, the edges of the captured object image may be different from the actual edges of the scanned image due to various distortions that may occur during scanning or copying. At block 206, the processor 104 may analyze the detected edges of the captured object image using pre-stored edge data and correlations between the captured object image and features of the captured background strip image. At block 208, the processor 104 may determine whether a feed skew has occurred on the captured object image based on the analysis of the detected edges. Based on a determination that the captured object image has straight edges, which means that a feed skew has not occurred, the processor 104 may perform a four-corner correction at block 210. The four-corner correction may include rotating the captured object image, orthogonally transforming the captured object image, applying perspective projection to a rectangular shape, combinations thereof, or the like.

However, based on a determination that the captured object image has curved edges, which may be defined as meaning that a feed skew is determined to have occurred, the processor 104 may identify curved edges of the captured object image through application of a curvature formula at block 212. The curvature formula may describe a combination of curvatures defined by cylindrical curve or other functions. At block 214, the processor 104 may de-curve the identified curved edges through horizontal scanline scaling to form a de-curved image. As discussed above, application of the horizontal scanline scaling may produce straight side edges of the scanned object image. In other words, application of the horizontal scanline scaling may closely approximate the curved side edges to the straight side edges of the original object. At block 216, the processor 104 may produce a corrected image of the captured object image through vertical scanline scaling of the de-curved image. Application of the vertical scanline scaling may correct the skew of the top and bottom edges of the scanned image to match the horizontal edges while adjusting the height of both of the side edges produced from approximation of the curved edges. Thus, the processor 104 may execute the method 200 to produce a corrected image of the scanned object image that closely matches the original object.

Turning now to FIG. 3, at block 302, the processor 104 may correct the feed skew of a scanned image through performance of a greedy algorithm-based transformation of the scanned image. Examples of greedy algorithm-based transformation or simply, greedy transformation, are described in more detail below. At block 304, the processor 104 may use a periodic pattern of the background strip to estimate the edges of the object in the scanned image. As discussed above, the background strip may be a hardware strip with a periodic pattern applied on hardware strip, which may be positioned beneath an object during scanning and that is to be captured with the image of the object. The apparatus 100 may capture an image of the background strip along with the image of the object. The apparatus 100 may use the background strip image to distinguish between the scanned object and the background. In an example, the background strip image may be correlated with the captured image of the object. A portion of the image with a correlation coefficient larger than a threshold may be classified as the background, while other portions may be considered to be the foreground. The processor 104 may find a first foreground found through a diagonal and up-to-down and down-to-up search and may estimate the foreground to be an edge point. At block 306, the processor 104 may perform a four-corner correction of the scanned image in instances in which the scanned object image has straight edges (e.g., a feed skew has not occurred on the scanned object image).

Some or all of the operations set forth in the methods 200 and 300 may be contained as utilities, programs, or subprograms, in any desired computer accessible medium. In addition, the methods 200 and 300 may be embodied by computer programs, which may exist in a variety of forms. For example, the methods 200 and 300 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
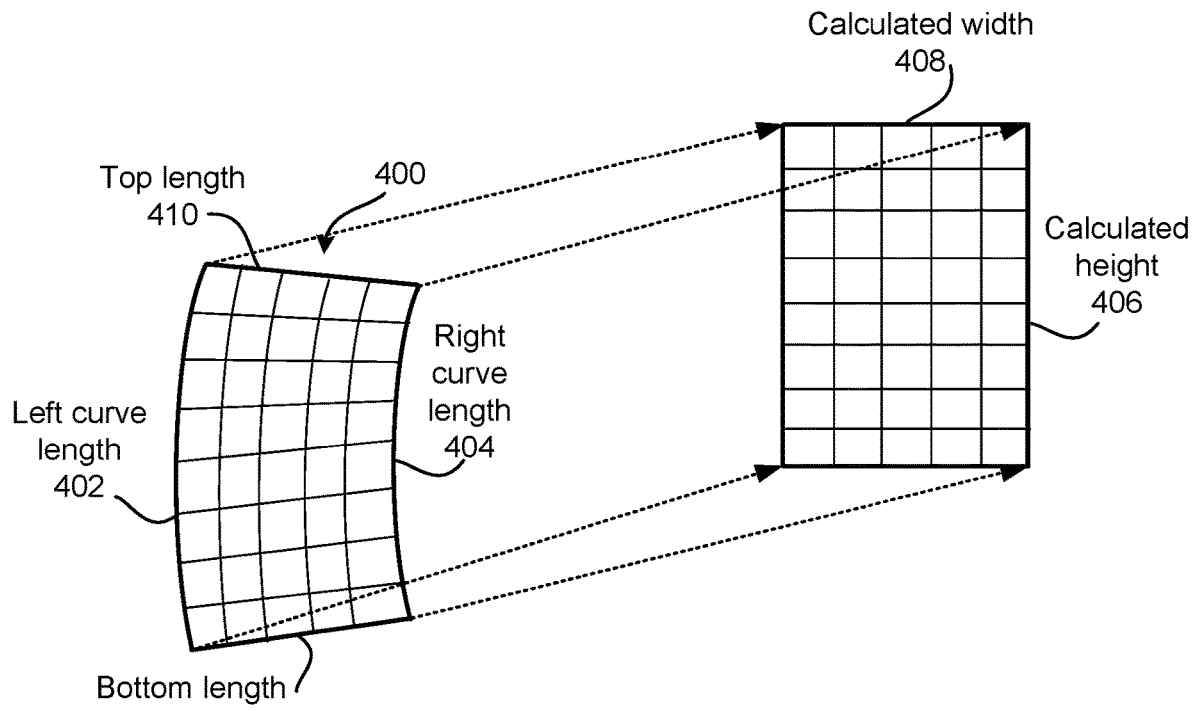
FIG. 4 shows an example feed skew correction.

According to examples, the processor 104 may perform a greedy transformation on a captured object image 400 based on a greedy algorithm to correct for feed skew of the captured object image 400. FIG. 4 shows an example of the captured object image 400, which has feed skew, being corrected using the greedy algorithm-based transformation. As shown, a left curve length 402 and a right curve length 404 may be used to produce a target calculated height 406. A target calculated width 408 may be produced through transformation of a top length 410 and a bottom length 412 of the captured object image 400.

Figure 5:
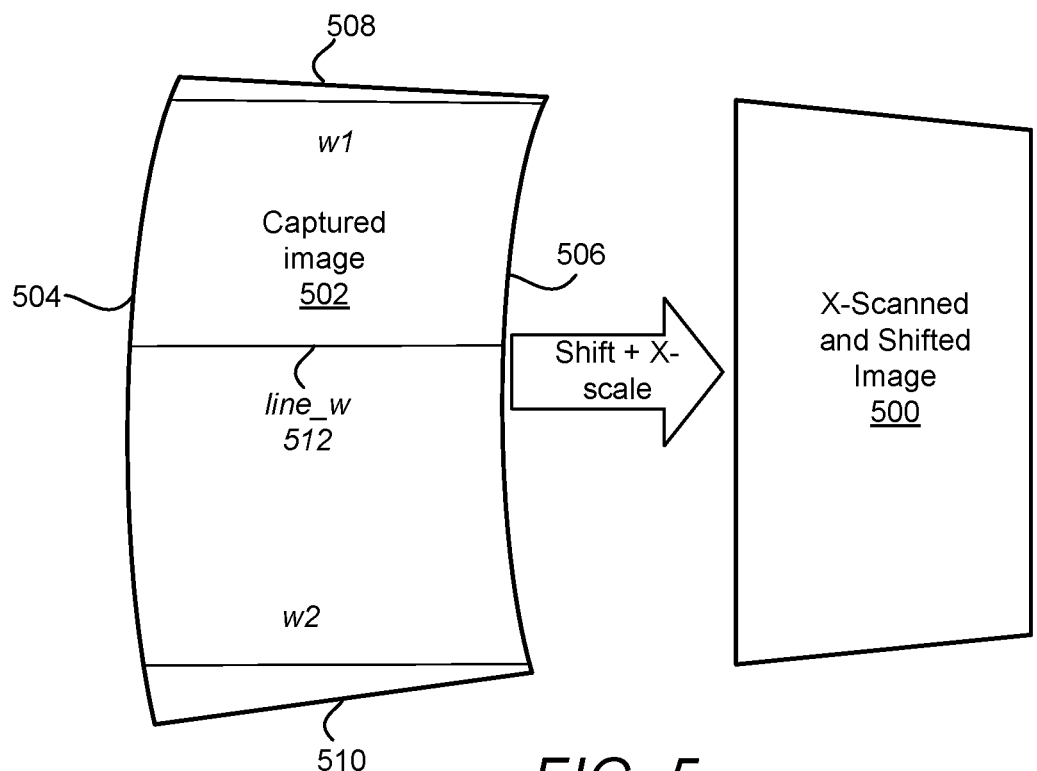
FIG. 5 shows an example shift and horizontal scanline scaling.

FIG. 5 shows an example shift and horizontal scanline scaling process. In an example, an X-scaled and shifted image 500 that represents a partially corrected version of a captured image 502 may have coordinates [(x0, y0), (xw, yh)]. The X-scaled and shifted image 500 may be a scaled and shifted version of the captured image 502. The corners of the captured image 502 may be defined as (tl.x, tl.y), (tr.x, tr.y), (bl.x, bl.y), (br.x, br.y), where tl is a top left corner, tr is a top right corner, bl is a bottom left corner, and br is a bottom right corner. A left curved edge 504 of the captured image 502 may be defined as (tl.x,tl.y)–(bl.x, bl.y), and a right curved edge 506 of the captured image 502 may be defined as (tr.x,tr.y)–(br.x, br.y). A top edge 508 of the captured image 502 may be defined as (tl.x,tl.y)–(tr.x, tr.y), and a bottom edge 510 of the captured image 502 may be defined as (bl.x,bl.y)–(br.x, br.y). In FIG. 5, line_w 512 represents the width of a scanline of the captured image 502 between the left edge 504 and the right edge 506. The shift and horizontal (X-scale) scanline scaling transformation may be implemented as follows:

1. for the top portion:
   For (line=tl.y; line<tr.y; line++)
   scale line with w/w1, shift to x0
2. for the middle portion (i.e., main block):
   For (line=tr.y; line<br.y; line++)
   scale line with w/line_w, shift to x0
3. for the bottom portion
   For (line=br.y; line<bl.y; line++)
   scale line with w/w2, shift to x0.

Figure 6:
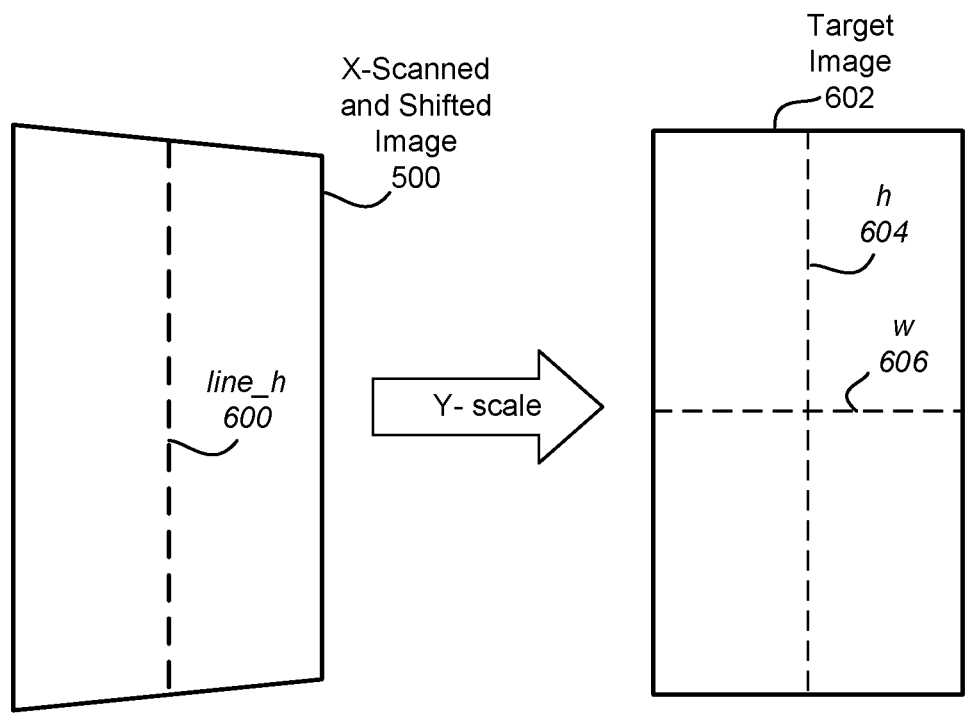
FIG. 6 shows an example vertical scanline scaling.

FIG. 6 shows an example vertical scanline (Y-scale) scaling process, which may be performed on the X-scaled and shifted image 500 after performance of the horizontal scanline scaling as discussed above with respect to FIG. 5. In FIG. 6, line_h 600 may represent the height of a vertical line of the intermediate target image 500, h 604 may represent the height of the target image 602, and w 606 may represent the width of the target image 602. The vertical scanline scaling may be implemented as follows:

For (line=x0; line<x0+w; line++)
scale line with h/line_h, shift to y0.

Figure 7:
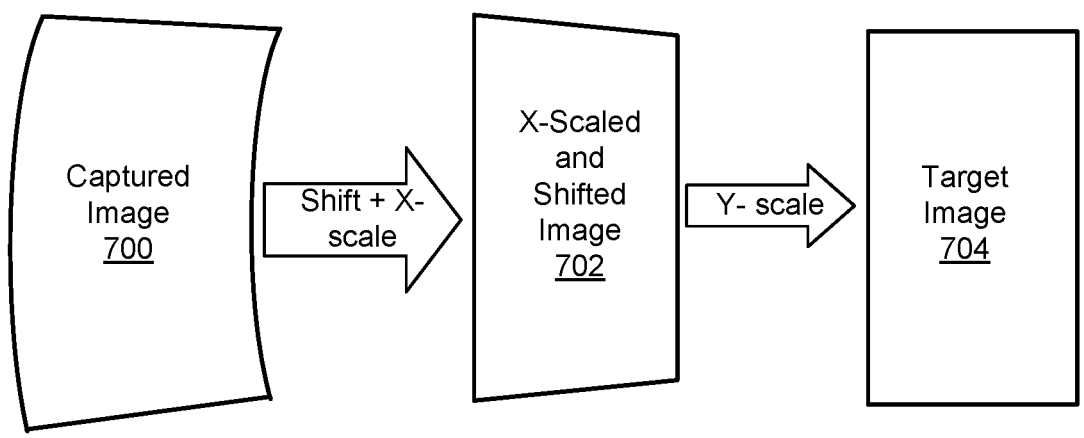
FIG. 7 shows an example process of feed skew correction.

An example feed skew correction process is shown in FIG. 7. The example feed skew correction process may de-curve the curved edges of a captured image 700 through a shift and horizontal scanline scaling. As discussed above, the shift and horizontal scanline scaling may produce the straight side edges of the captured image 700. In other words, the horizontal scanline scaling process may closely approximate the curved side edges of the captured image 700 to straight side edges as shown as an X-scaled and shifted image 702. In addition, a vertical scanline scaling process may be implemented on the X-scaled and shifted image 702 to generate the target image 704, e.g., a corrected version of the captured image 700. The vertical scanline scaling process may correct the skew of the top and bottom edges of the captured image 700 to match the horizontal edges while adjusting the height of both of the side edges produced from approximation of the curved edges.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:
1. An apparatus comprising:
   a processor;

a memory on which is stored machine readable instructions executable by the processor to:
   detect top, bottom, and side edges of a scanned object image;
   based on a determination that the side edges of the scanned object image are curved, determine that a feed skew has occurred on the scanned object image;
   based on a determination that the feed skew has occurred:
      identify the curved side edges of the scanned object image;
      apply a horizontal scanline scaling to the curved side edges of the scanned object image to scale and shift the curved side edges into straight side edges and produce a de-curved image having the straight side edges; and
      apply a vertical scanline scaling to the de-curved image to correct a skew of the top and bottom edges and produce a corrected image having straight top, bottom, and side edges.

2. The apparatus of claim 1, wherein the instructions are further executable by the processor to perform a greedy transformation of the scanned object image to correct the feed skew.

3. The apparatus of claim 1 wherein the instructions are further executable by the processor to use an image of a background strip to detect the top, bottom, and side edges of the scanned object image.

4. The apparatus of claim 3, wherein the background strip comprises a periodic pattern to differentiate between a background and the scanned object image.

5. The apparatus of claim 4, wherein the machine-readable instructions are further executable by the processor to determine edge profiles and coordinates of corners of the scanned object image using properties of the background to detect the top, bottom, and side edges of the scanned object image.

6. The apparatus of claim 1, wherein the instructions are further executable by the processor to determine that the top and bottom edges of the scanned object image are straight edges and to perform a four-corner correction of the scanned object image based on the determination that the top and bottom edges of the scanned object image are straight edges.

7. The apparatus of claim 6, wherein the four-corner correction is any of:
   deskew;
   shear; or
   perspective projection of the scanned object image.

8. A computer-implemented method comprising:
   accessing, by a processor, a captured image of an object;
   detecting, by the processor, top, bottom, and side edges of the captured image of the object;
   based on a determination that the side edges of the captured image of the object are curved, determining, by the processor, that a feed skew has occurred on the captured image of the object;
   based on a determination that the feed skew has occurred:
      identifying, by the processor, the curved side edges of the captured image of the object;
      applying, by the processor, a horizontal scanline scaling to the curved side edges of the captured image of the object to scale and shift the curved side edges into straight side edges and produce a de-curved image having the straight side edges; and
      applying, by the processor, a vertical scanline scaling to the de-curved image to correct a skew of the top and bottom edges and produce a corrected image having straight top, bottom, and side edges.

9. The method of claim 8, further comprising:
   determining that the top and bottom edges of the object in the captured image are straight edges; and
   performing a four-corner correction of the captured image based on the determination that the top and bottom edges of the object in the captured image are straight edges.

10. The method of claim 9, wherein performing the four-corner correction includes performing any of:
   rotating the object in the captured image;
   orthogonally transforming the object in the captured image; or
   projecting the object in the captured image.

11. The method of claim 8, further comprising:
   using a background strip to determine a background of the captured image of the object, wherein the background strip comprises features to distinguish between the object and the background on the captured image of the object.

12. The method of claim 11, wherein the features comprise periodic patterns marked on the background strip.

13. A non-transitory computer readable medium on which is stored machine readable instructions that when executed by a processor, cause the processor to:
   detect top, bottom, and side edges of a scanned object image;
   based on a determination that the side edges of the scanned object image are curved, determine that a feed skew has occurred on the scanned object image;
   based on a determination that the feed skew has occurred:
      identify the curved side edges of the scanned object image;
      apply a horizontal scanline scaling to the curved side edges of the scanned object image to scale and shift the curved side edges into straight side edges and produce a de-curved image having the straight side edges; and
   apply a vertical scanline scaling to the de-curved image to correct a skew of the top and bottom edges and produce a corrected image having straight top, bottom, and side edges.

14. The non-transitory computer readable medium of claim 13, wherein the instructions are further to cause the processor to correct the feed skew through performance of a greedy transformation of the scanned object image.

15. The non-transitory computer readable medium of claim 13, wherein the instructions are further to cause the processor to use a periodic pattern of the background strip to estimate the top, bottom, and side edges of the scanned object image.

* * * * *